Apr. 10, 1923.
E. H. JOHNSON
HANDLE FOR KITCHEN UTENSILS
Filed July 23, 1920
1,451,338
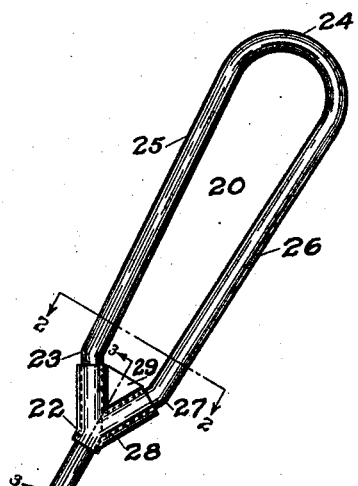
FIG. 1
FIG. 2
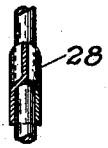
FIG. 3
FIG. 4
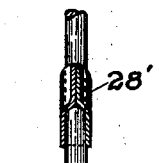
FIG. 5
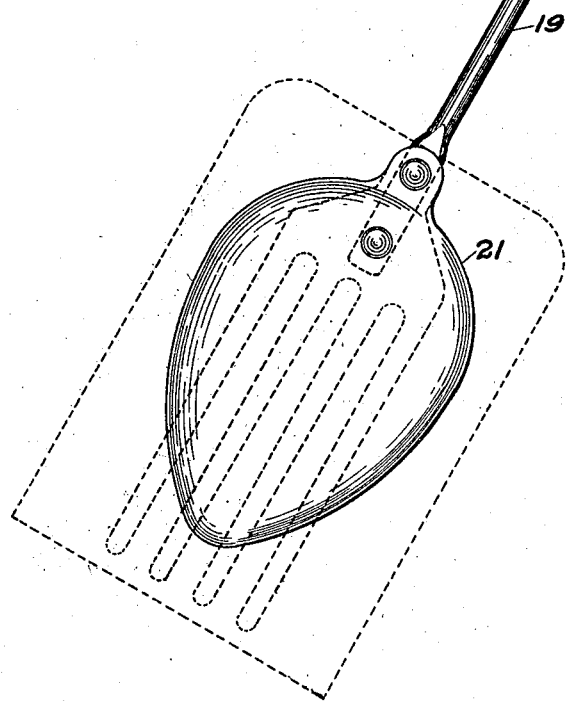
INVENTOR
Edward H. Johnson
BY C. E. Beach,
ATTORNEY Patented Apr. 10, 1923.

1,451,338

UNITED STATES PATENT OFFICE.

EDWARD H. JOHNSON, OF BINGHAMTON, NEW YORK, ASSIGNOR TO THE A. & J. MANUFACTURING COMPANY, OF BINGHAMTON, NEW YORK, A CORPORATION OF NEW YORK.

HANDLE FOR KITCHEN UTENSILS.

Application filed July 23, 1920. Serial No. 398,377.

*To all whom it may concern:*

Be it known that I, EDWARD H. JOHNSON, a citizen of the United States, residing at Binghamton, in the county of Broome and State of New York, have invented certain new and useful Improvements in Handles for Kitchen Utensils, of which the following is a specification.

This invention relates to handles for kitchen utensils, and the like, and is particularly adapted for such utensils as spoons, forks and ladles.

Prior handles for such utensils have either comprised a grip piece separate from the shank, and therefore liable to become objectionably loose; or a grip and shank formed of one piece of rod or wire, the shank portion of which is doubled either parallel or twisted, the interstices between such parallel or twisted rods having formed objectionable lodging places for food and other foreign matter, thus rendering it difficult to keep such utensils in sanitary condition.

The manufacture of such prior handles employing a double rod or wire for the entire length of the shank involves waste incident to the use of an excessive amount of material, as a rod of such size to afford a convenient grip has sufficient mechanical strength to serve singly as a shank. To avoid such waste, some such handles have been made by so bending a rod as to provide a shank one end of which is secured to the spoon bowl or other utensil member, and the other end of which is bent back upon itself so as to provide a grip loop; such other end being twisted one or more times around the shank in order to provide suitable stability of the grip. With such construction, interstices are provided in which foreign matter may find lodgment, and the exposed end of the wire is liable to cut or bruise the hands of those using or washing the utensil, and to catch in fabrics employed in cleansing the same.

An object of this invention is to provide such a handle in which a single piece of rod serves both for the shank and for the grip, and which may be manufactured with a minimum expenditure of both labor and material.

Another object of this invention is to provide such a handle which is so formed as to avoid small crevices or spaces which cannot be readily cleansed during the ordinary washing of the utensil.

A further object is to provide a handle of the character described which is devoid of sharp corners and in which the end of the rod is so inclosed as to avoid catching on fabric used in cleansing it, and so as to avoid injury to the hands of the user.

This invention consists of certain features of construction which are illustrated in the accompanying drawing in which—

Figure 1 is a plan view of a spoon having a handle embodying this invention;

Fig. 2 is a sectional view of the grip of the handle shown in Fig. 1, taken on the line 2—2;

Fig. 3 is a sectional view of the adjacent portions of the grip and shank taken on the line 3—3; and Figs. 4 and 5 show a modified form of the construction shown by Figs. 2 and 3 respectively.

Referring to the drawing: the shank 19 and the grip 20 are formed of a single piece of metal rod, one end of which is suitably secured to the spoon bowl 21, or to such other utensil member as may be desired. At the other end of the shank said rod is bent abruptly to the left at 22 and again bent abruptly to the right at 23, so as to form one arm of a Y; has a curved return bend extending to the right at 24; and the remaining end of said rod is turned abruptly at 27 toward the bend 22 and brought into abutting relation with the side of the said bend. An open hand grip loop is thus formed, which loop has the rounded end 24 remote from the abrupt bend 22, and the sides 25 and 26 of which loop gradually converge toward said abrupt bend.

A sheet metal piece 28 is applied to the portions of said rod adjacent to said abrupt bends, and is wrapped around said rod so as to provide a tightly fitting Y-shaped socket, as most clearly indicated by Figs. 2 and 3; a web 29 being formed between the arms of said socket.

In the alternative construction shown in Figs. 4 and 5 the metal piece 28' is first drawn into the form of a flattened tapering ferrule, the small end of which has an opening therethrough which snugly fits over the shank 19, and said ferrule is placed upon said shank before the hand grip is formed.

After the completion of said loop, the ferrule is moved into the position shown, and is tightly pressed around the Y-arms of the grip.

If the handle is to be coated by a galvanizing or tinning process; such coating should be applied after the complete assembly thereof, so as to seal the cracks between adjacent portions of the metal piece and the rod.

In use, the grip 20 may be readily grasped and firmly held, and provides a very rigid and convenient means for using the spoon or other utensil part attached to this handle.

When cleansing the handle, all surfaces may be readily reached and cleansed, the web 29 serving to prevent the lodgment of foreign matter at the apex of the Y-arms of the grip, there being no small interstices which are difficult to cleanse, and the end of the rod being so inclosed as to prevent its catching on fabric used in cleansing the utensil.

What I claim and desire to secure by Letters Patent of the United States of America is:

1. In a handle for a culinary utensil: a metal rod one end of which is suitably attached to such utensil, said rod being abruptly bent to one side at a suitable distance from said attached end thereof, the portion of said rod beyond such bend being fashioned to provide an open hand grip loop having a rounded end remote from said abrupt bend, the sides of such loop gradually converging toward said abrupt bend, and the remaining end of said rod being turned abruptly toward said abrupt bend and brought into abutting relation with the side of said rod thereat; and a metal piece wrapped around said rod so as to provide a tightly fitting Y-shaped socket containing said abutting end and said abrupt bend, and separately enclosing portions of said rod at either side of said bend and adjacent to said end.

2. In a handle for a culinary utensil: a metal rod one end of which is suitably attached to such utensil, said rod being abruptly bent to one side at a suitable distance from said attached end thereof, the portion of said rod beyond such bend being fashioned to provide an open hand grip loop having a rounded end remote from said bend, the sides of such loop gradually converging toward said abrupt bend, and the remaining end of said rod being turned abruptly toward said abrupt bend and brought into abutting relation with the side of said rod thereat; and a ferrule containing said abutting end and said abrupt bend and separately enclosing portions of said rod at either side of said bend and adjacent to said end.

3. In a handle for a culinary utensil: a metal rod one end of which is suitably attached to such utensil, said rod being abruptly bent to one side at a suitable distance from said attached end thereof, the portion of said rod beyond such bend being fashioned to provide an open hand grip loop having a rounded end remote from said bend, the sides of such loop gradually converging toward said abrupt bend, and the remaining end of said rod being turned abruptly toward said abrupt bend and brought into abutting relation with the side of said rod thereat; and a ferrule inclosing said abutting end and said abrupt bend, said ferrule being tightly pressed around and individually encircling the portions of said rod immediately adjacent to said end and to said bend.

In witness whereof, I hereunto subscribe my name, this 21st day of July, 1920.

EDWARD H. JOHNSON.